(12) United States Patent
Kwon et al.

(10) Patent No.: US 12,215,194 B2
(45) Date of Patent: Feb. 4, 2025

(54) METHOD FOR PRODUCING POLYAMIDE COMPRISING AMIDE-BASED MOLECULAR WEIGHT MODIFIER, AND POLYAMIDE PRODUCED THEREBY

(71) Applicant: HANWHA SOLUTIONS CORPORATION, Seoul (KR)

(72) Inventors: Kyung Ho Kwon, Daegu (KR); Seung Hoe Do, Daejeon (KR); Jin Seo Lee, Seongnam-si (KR); Dae Hak Kim, Seongnam-si (KR); Kyoung Won Yim, Gwangju (KR); Do Kyoung Kim, Busan (KR); Hye Yeon Lee, Seoul (KR)

(73) Assignee: HANWHA SOLUTIONS CORPORATION, Seoul (KR)

( * ) Notice: Subject to any disclaimer, the term of this patent is extended or adjusted under 35 U.S.C. 154(b) by 581 days.

(21) Appl. No.: 16/767,406

(22) PCT Filed: Oct. 30, 2018

(86) PCT No.: PCT/KR2018/012972
§ 371 (c)(1),
(2) Date: May 27, 2020

(87) PCT Pub. No.: WO2019/107758
PCT Pub. Date: Jun. 6, 2019

(65) Prior Publication Data
US 2020/0385521 A1    Dec. 10, 2020

(30) Foreign Application Priority Data

Nov. 28, 2017 (KR) .................. 10-2017-0160742

(51) Int. Cl.
*C08G 69/20*    (2006.01)

(52) U.S. Cl.
CPC .................... *C08G 69/20* (2013.01)

(58) Field of Classification Search
None
See application file for complete search history.

(56) References Cited

U.S. PATENT DOCUMENTS 3,239,490 A * 3/1966 Gee .................. C08G 69/18
                                             528/319
3,423,372 A    1/1969 Steely
(Continued)

FOREIGN PATENT DOCUMENTS

EP    0156129 A1    10/1985
EP    1091991 A1    4/2001
(Continued)

OTHER PUBLICATIONS

Machine translation of KR20140115171A from espacenet (Year: NA).*

(Continued)

*Primary Examiner* — Rachel Kahn
(74) *Attorney, Agent, or Firm* — Sughrue Mion, PLLC

(57) ABSTRACT

Provided are a method for producing a polyamide including an amide-based molecular weight controller and a polyamide produced thereby, wherein the amide-based molecular weight controller may easily control the molecular weight of the polyamide to have a narrow molecular weight distribution so as to prevent an increase in the molecular weight due to a basic intermediate produced in anionic polymerization and a side reaction generated under a high-temperature polymerization condition.

6 Claims, 1 Drawing Sheet

(56) References Cited

U.S. PATENT DOCUMENTS

| | | | |
|---|---|---|---|
| 3,513,135 A * | 5/1970 | Hermann | C08G 69/18 |
| | | | 524/602 |
| 3,793,258 A | 2/1974 | Reinking et al. | |
| 3,875,121 A | 4/1975 | Brassat et al. | |
| 3,878,173 A | 4/1975 | Biensan et al. | |
| 3,879,354 A * | 4/1975 | Bonner | C08G 69/18 |
| | | | 528/499 |
| 4,067,861 A | 1/1978 | Biensan et al. | |
| 4,611,052 A | 9/1986 | Vrinssen et al. | |
| 4,739,007 A * | 4/1988 | Okada | C08J 5/005 |
| | | | 524/789 |
| 4,754,000 A | 6/1988 | Meyer et al. | |
| 5,747,634 A | 5/1998 | Schmid et al. | |
| 6,579,965 B2 | 6/2003 | Hoogen et al. | |
| 6,627,726 B1 | 9/2003 | Bruchmann et al. | |
| 6,713,596 B1 | 3/2004 | Faulhammer et al. | |
| 8,124,686 B2 | 2/2012 | Loyen et al. | |
| 9,657,138 B2 | 5/2017 | Lee et al. | |
| 2002/0082382 A1 | 6/2002 | Le Crom et al. | |
| 2002/0161167 A1 | 10/2002 | Hoogen et al. | |
| 2005/0090382 A1 | 4/2005 | Schmid et al. | |
| 2005/0197446 A1 | 9/2005 | Loyen et al. | |
| 2008/0312353 A1 | 12/2008 | Eibeck et al. | |
| 2010/0152313 A1 | 6/2010 | Eibeck et al. | |
| 2012/0088899 A1 * | 4/2012 | Scherzer | C08G 69/18 |
| | | | 528/323 |
| 2016/0046765 A1 * | 2/2016 | Oda | C08L 77/06 |
| | | | 528/331 |
| 2016/0297930 A1 | 10/2016 | Lee et al. | |

FOREIGN PATENT DOCUMENTS

| | | | | |
|---|---|---|---|---|
| GB | 1060747 A * | 3/1967 | | C08G 69/20 |
| JP | 9-208690 A | 8/1997 | | |
| JP | 2005-248180 A | 9/2005 | | |
| KR | 10-2001-0108395 A | 12/2001 | | |
| KR | 10-0322263 B1 | 2/2002 | | |
| KR | 10-2002-0023654 A | 3/2002 | | |
| KR | 10-0638535 B1 | 10/2006 | | |
| KR | 10-1188589 B1 | 10/2012 | | |
| KR | 10-1349063 B1 | 1/2014 | | |
| KR | 20140115171 A * | 9/2014 | | |
| KR | 10-1533891 B1 | 7/2015 | | |
| KR | 10-2015-0119252 A | 10/2015 | | |
| KR | 10-2017-0045889 A | 4/2017 | | |

OTHER PUBLICATIONS

A. Wollny et al., "In situ Formation and Compounding of Polyamide 12 by Reactive Extrusion", J. Applied Polymer Science, 2003, vol. 90, pp. 344-351 (8 pages total).

International Search Report dated Jan. 31, 2019 in Application No. PCT/KR2018/012972.

* cited by examiner

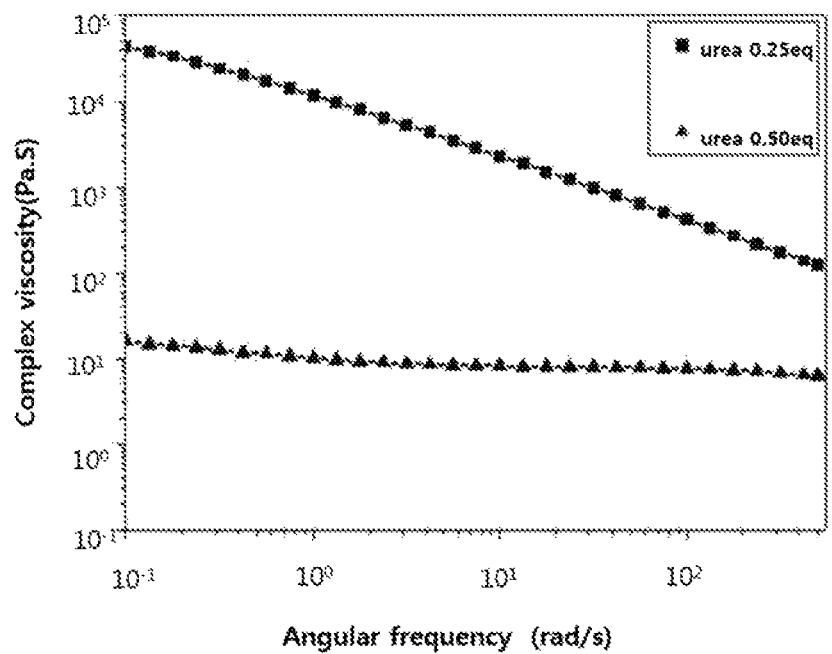

METHOD FOR PRODUCING POLYAMIDE COMPRISING AMIDE-BASED MOLECULAR WEIGHT MODIFIER, AND POLYAMIDE PRODUCED THEREBY

CROSS REFERENCE TO RELATED APPLICATIONS

This application is a National Stage of International Application No. PCT/KR/2018/012972, filed Oct. 30, 2018, claiming priority to Korean Patent Application No. 10-2017-0160742, filed Nov. 28, 2017.

TECHNICAL FIELD

The present invention relates to a method for producing a polyamide including an amide-based molecular weight controller (molecular weight modifier) and a polyamide produced thereby, and more particularly, to a method for producing a polyamide including an amide-based molecular weight controller and a polyamide produced thereby, wherein the amide-based molecular weight controller can easily control the molecular weight of the polyamide to have a narrow molecular weight distribution so as to prevent an increase in the molecular weight due to a basic intermediate produced in anionic polymerization and a side reaction generated under a high-temperature polymerization condition.

BACKGROUND ART

A polyamide resin is a linear polymer bonded by an amide (—NHCO—) bond. The polyamide resin is strong, has excellent physical properties in terms of friction resistance, abrasion resistance, oil resistance, and solvent resistance, and is easily melt-molded. Therefore, the polyamide resin is widely used as clothing materials, fibers for industrial materials, engineering plastics, and the like. Polyamides may be classified into aliphatic polyamides, aromatic polyamides, and aliphatic cyclic polyamides according to molecular structures. The aliphatic polyamides may be collectively referred to as nylon, and the aromatic polyamides may be collectively referred to as aramid.

Polyamides are produced by various polymerization methods and may be classified into those produced by ring-opening polymerization of lactam, such as nylon 6, those produced by polycondensation of diamines and dibasic acids, such as nylon 6,6, nylon 6,10 and nylon 4,6, and those produced by polycondensation of aminocarboxylic acids, such as nylon 11 and nylon 12. Furthermore, so-called hybrid polymerized nylons, such as hybrid condensates of caprolactam and 6,10-nylon salts (hexamethylenediamine and sebacate), are industrially produced, and various polyamides including functional groups such as side chains and hydroxyl groups, aromatic rings and, hetero rings in molecules have been studied.

Lactams, for example, caprolactam may be anionically polymerized. This method generally uses a catalyst and an initiator (also referred to as an activator) (activated anionic polymerization). Initiators or activators frequently used till now include diisocyanates or derivatives thereof.

U.S. Pat. No. 4,754,000 (Bayer AG) discloses activated anionic polymerization of lactams, which produces polyamides using biuret-group-containing polyisocyanates derived from non-aromatic diisocyanates as an activator.

EP 1091991 (BASF AG) discloses a composition including polyisocyanurates having more than 3.5 NCO functional groups on average as a component A and a method for preparing a surface coating composition using the composition.

In U.S. Pat. No. 3,423,372, uncapped polyisocyanates are used (resulting in a significant reduction in reactivity), and an activator concentration in that example is very low (1/200 mol to 1/50 mol). Therefore, the polymerization time is significantly delayed.

In EP 0156129, a rubber (i.e., elastomer) is used as a precursor of a multifunctional activator. Therefore, the resulting PA is up to 1.12 GPa and is not rigid. The activator has a high weight average molecular weight (Mw). In this case, a large amount of activator is required (20% or more). A mixture of a bifunctional activator and a multifunctional activator is used. Therefore, the resulting polyamide is not a crosslinked material.

In addition, U.S. Pat. No. 4,067,861 (1978) discloses a technology for anionic polymerization of lactams through an extruder. A metering pump is installed between an extruder body and an extruder die so as to obtain a constant output and uniform viscosity and physical properties. Although attempting to mechanically solve viscosity non-uniformity, this is not a fundamental solution.

U.S. Pat. No. 3,878,173 (1975) points out the problem of unstable viscosity due to thermal decomposition and the formation of a structurally disorderly branching structure. However, in order to prevent decomposition of a synthesized polymer, an attempt to solve the problem is made just by using a more acidic additive. This US patent does not disclose the solution to the non-uniform branching structure. For reference, a branching side reaction that occurs during polyamide anion polymerization is discussed in detail in M. P. Stevens, "Polymer Chemistry", 2nd Ed., Oxford University Press, p 429 (1990) and G. Odian, "Principles of Polymerization", 2nd Ed., John Wiley & Sons, p 541 (1981).

In particular, in U.S. Pat. No. 5,747,634 (1998), a solution liquid system containing a catalyst and an initiator (reaction accelerator) at the same time is introduced so as to obtain a more uniform product. U.S. Pat. No. 5,747,634 discloses that the solution liquid system is introduced to obtain uniform products with a constant quality and a high reproducibility result, but there is a problem that is not efficient due to a problem of solvent removal when applying to a reaction extrusion method.

PRIOR ART DOCUMENTS (Patent Document 1) U.S. Pat. No. 6,713,596 B1
(Patent Document 2) Korean Patent Registration No. 10-1533891
(Patent Document 3) Korean Patent Registration No. 10-1349063
(Patent Document 4) Korean Patent Registration No. 10-0322263
(Non-Patent Document 5) METHOD FOR ANIONIC POLYMERIZATION OF LACTAMS (Atofina) J. Applied Polymer Science, 2003, 90, 344-351, In-situ Formation and Compounding of Polyamide 12 by Reactive Extrusion

DESCRIPTION OF EMBODIMENTS

Technical Problem

The present invention aims to solve the above-described problems of the related art and the technical problems requested from the past.

An object of the present invention is to provide a method for producing a polyamide including an amide-based molecular weight controller and a polyamide produced thereby, wherein the amide-based molecular weight controller can easily control the molecular weight of the polyamide to have a narrow molecular weight distribution so as to prevent an increase in the molecular weight due to a basic intermediate produced in anionic polymerization and a side reaction generated under a high-temperature polymerization condition.

Another object of the present invention is to provide a method for producing a polyamide including an amide-based molecular weight controller and a polyamide produced thereby, wherein the method is an eco-friendly process method without using a solvent as a catalyst and can produce a polymer having a uniform molecular weight and a high conversion rate at a low temperature within a short polymerization time in comparison with a conventional polymerization method.

Solution to Problem

In order to achieve the objects, the present invention provides a method for producing a polyamide including an amide-based molecular weight controller.

The method is a method for producing a polyamide including an amide-based molecular weight controller by an anionic polymerization reaction, wherein lactam, and based on 100 parts by weight of the entire lactam, 0.01 parts by weight to 20 parts by weight of an alkali metal as an initiator, 0.3 parts by weight to 10 parts by weight of a compound represented by Formula 1 as a molecular weight controller, and 0.002 parts by weight to 7.0 parts by weight of an activator are included:

[Formula 1]

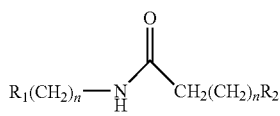

wherein $R_1$ and $R_2$ are identical to or different from each other, are a substituent containing a hetero atom, or are each hydrogen, a $C_1$-$C_{10}$ linear or branched alkyl, a $C_2$-$C_{10}$ linear or branched alkenyl, a $C_6$-$C_{20}$ aryl, a $C_7$-$C_{21}$ alkylaryl, a $C_7$-$C_{21}$ arylalkyl, a $C_3$-$C_{10}$ cycloalkyl, a $C_1$-$C_{10}$ alkoxy, a $C_6$-$C_{20}$ aryloxy, a $C_1$-$C_{10}$ alkylsilyl, a $C_6$-$C_{20}$ arylsilyl, or halogen, and n is each independently a rational number of 0 to 20.

In one preferred embodiment of the present invention, the molecular weight controller may be selected from compounds represented by Formulae 2 to 4:

[Formula 2]

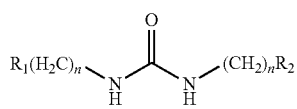

wherein $R_1$ and $R_2$ are identical to or different from each other, are a substituent containing a hetero atom, or are each hydrogen, a $C_1$-$C_{10}$ linear or branched alkyl, a $C_2$-$C_{10}$ linear or branched alkenyl, a $C_6$-$C_{20}$ aryl, a $C_7$-$C_{21}$ alkylaryl, a $C_7$-$C_{21}$ arylalkyl, a $C_3$-$C_{10}$ cycloalkyl, a $C_1$-$C_{10}$ alkoxy, a $C_6$-$C_{20}$ aryloxy, a $C_1$-$C_{10}$ alkylsilyl, a $C_6$-$C_{20}$ arylsilyl, or halogen, and n is each independently a rational number of 0 to 20,

[Formula 3]

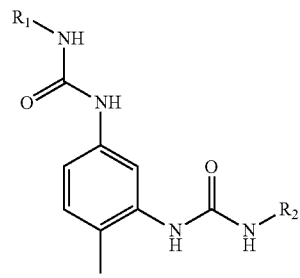

wherein $R_1$ and $R_2$ are identical to or different from each other, are a substituent containing a hetero atom, or are each hydrogen, a $C_1$-$C_{10}$ linear or branched alkyl, a $C_2$-$C_{10}$ linear or branched alkenyl, a $C_6$-$C_{20}$ aryl, a $C_7$-$C_{21}$ alkylaryl, a $C_7$-$C_{21}$ arylalkyl, a $C_3$-$C_{10}$ cycloalkyl, a $C_1$-$C_{10}$ alkoxy, a $C_6$-$C_{20}$ aryloxy, a $C_1$-$C_{10}$ alkylsilyl, a $C_6$-$C_{20}$ arylsilyl, or halogen, and n is each independently a rational number of 0 to 20, and

[Formula 4]

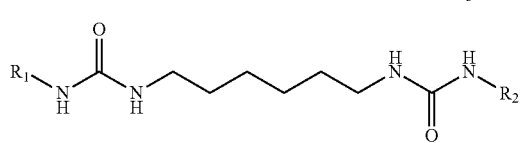

wherein $R_1$ and $R_2$ are identical to or different from each other, are a substituent containing a hetero atom, or are each hydrogen, a $C_1$-$C_{10}$ linear or branched alkyl, a $C_2$-$C_{10}$ linear or branched alkenyl, a $C_6$-$C_{20}$ aryl, a $C_7$-$C_{21}$ alkylaryl, a $C_7$-$C_{21}$ arylalkyl, a $C_3$-$C_{10}$ cycloalkyl, a $C_1$-$C_{10}$ alkoxy, a $C_6$-$C_{20}$ aryloxy, a $C_1$-$C_{10}$ alkylsilyl, a $C_6$-$C_{20}$ arylsilyl, or halogen, and n is each independently a rational number of 0 to 20.

In one preferred embodiment of the present invention, the alkali metal may include at least one selected from the group consisting of metal hydride, metal hydroxide, and metal alkoxide.

In one preferred embodiment of the present invention, the lactam may be preferably laurolactam, but the present invention is not limited thereto. The lactam may include caprolactam, piperidone, pyrrolidone, enantolactam, and caprylactam, propiolactam. In some cases, the lactam may include 2-pyrrolidone, valerolactam, caprolactam, heptanolactam, octanolactam, nonanolactam, decanolactam, undecanolactam, dodecanolactam, or any mixture thereof.

In one preferred embodiment of the present invention, the activator may include at least one selected from the group consisting of carbon dioxide, benzoyl chloride, N-acetyl caprolactam, N-acetyl laurolactam, octadecyl isocyanate (SIC), toluene diisocyanate (TDI), hexamethylene diisocyanate (HDI), and any mixture thereof.

In one preferred embodiment of the present invention, the polymerization reaction may be performed within a range of 0.5 minutes to 120 minutes based on an experimental reactor. The polymerization reaction time is not particularly limited and may be appropriately adjusted according to a weight of a compound introduced or a size and a type of the reactor.

In one preferred embodiment of the present invention, the lactam in the polymerization reaction may have a conversion rate of 95% or more.

In one preferred embodiment of the present invention, the polymerization reaction may be performed within a range of 180° C. to 300° C.

The present invention provides a polyamide produced by the above-described method.

In one preferred embodiment of the present invention, the polyamide may have a polydispersity index (PDI) of 3.0 or less.

In one preferred embodiment of the present invention, a weight average molecular weight (Mw) of the polyamide may be in a range of 20,000 to 100,000.

In one preferred embodiment of the present invention, the polyamide may have a linear, branched, hyperbranched, or dendritic structure.

The present invention provides a parts material selected from the group consisting of a vehicle material, an electronic device material, an industrial pipe material, a construction engineering material, a 3D printer material, a textile material, a cladding material, a machine tool material, a medical material, an aviation material, a photovoltaic material, a battery material, a sports material, a household appliance material, a household material, and a cosmetic material, which each include the polyamide.

In a specific example, a product including the parts material may be vehicle air ducts, plastic/rubber compounds, adhesives, lights, polymer optical fibers, fuel filter caps, line systems, cables for electronic devices, reflectors, sheaths of cables, optical fibers, wire protection tubes, control units, pipe tubes, liners, pipe coatings, oilfield exploration hoses, 3D printers, multifilaments, spray hoses, valves, ducts, pulps, gears, medical catheters, flame retardants for aircraft, solar cell protection plates, cosmetic materials, high hardness films, ski boots, headsets, glasses frames, toothbrushes, water bottles, or outsoles, but the present invention is not limited thereto.

Advantageous Effects of Disclosure

As described above, it is possible to produce a polyamide in which the molecular weight of the polyamide can be easily controlled to have a narrow molecular weight distribution so as to prevent an increase in the molecular weight due to a basic intermediate produced in anionic polymerization and a side reaction generated under a high-temperature polymerization condition.

The present invention is also an eco-friendly processing method without using a solvent as a catalyst and has an effect that produces a polymer having a uniform molecular weight and a high conversion rate within a short polymerization reaction time at a low temperature in comparison with a conventional polymerization method.

The present invention also has an effect that the polymerization time is short and bulk polymerization is enabled to greatly improve productivity through a continuous process. Therefore, the efficiency of the production process is greatly improved and the production cost is greatly reduced.

BRIEF DESCRIPTION OF DRAWING

FIG. 1 is a graph showing the result of rheometer analysis of a polymer sample produced according to the present invention.

BEST MODE

The present invention will be described with reference to specific embodiments and the accompanying drawings. The embodiments will be described in detail in such a manner that the present invention may be carried out by those of ordinary skill in the art. It should be understood that various embodiments of the present invention are different, but need not be mutually exclusive. For example, certain shapes, structures, and features described herein may be implemented in other embodiments without departing from the spirit and scope of the present invention in connection with one embodiment.

Therefore, the following detailed description is not to be taken in a limiting sense, and the scope of the present invention is to be limited only by the appended claims and the entire scope of equivalents thereof, if properly explained.

In addition, unless otherwise specified in the present specification, the term "substitution" or "substituted" means that one or more hydrogen atoms in the functional groups of the present invention are substituted with one or more substituents selected from the group consisting of a halogen atom (—F, —Cl, —Br, or —I), a hydroxy group, a nitro group, a cyano group, an amino group, an amidino group, a hydrazine group, a hydrazone group, a carboxyl group, an ester group, a ketone group, a substituted or unsubstituted alkyl group, a substituted or unsubstituted alicyclic organic group, a substituted or unsubstituted aryl group, a substituted or unsubstituted alkenyl group, a substituted or unsubstituted alkynyl group, a substituted or unsubstituted heteroaryl group, and a substituted or unsubstituted heterocyclic group. These substituents may be linked to each other to form a ring.

In the present invention, unless otherwise specified, the term "substituted" means that a hydrogen atom is substituted with a substituent such as a halogen atom, a $C_1$-$C_{20}$ hydrocarbon group, a $C_1$-$C_{20}$ alkoxy group, and a $C_6$-$C_{20}$ aryloxy group.

In addition, unless otherwise specified, the term "hydrocarbon group" refers to a linear, branched, or cyclic saturated or unsaturated hydrocarbon group. The alkyl group, the alkenyl group, the alkynyl group, and the like may be linear, branched, or cyclic.

In addition, unless otherwise specified in the present specification, the term "alkyl group" refers to a $C_1$-$C_{30}$ alkyl group and the term "aryl group" refers to a $C_6$-$C_{30}$ aryl group. In the present specification, the term "heterocyclic group" refers to a group in which one to three heteroatoms selected from the group consisting of O, S, N, P, Si, and any combination thereof are contained in one ring. Examples of the heterocyclic group may include pyridine, thiophene, and pyrazine, but the present invention is not limited thereto.

Hereinafter, embodiments of the present invention will be described with reference to the accompanying drawings, so that those of ordinary skill in the art can easily carry out the present invention.

As described above, in a conventional anionic polymerization, there is a limitation in solving a high viscosity phenomenon of a polymer due to an increase in molecular weight due to a basic intermediate produced in anionic polymerization and a side reaction such as a branching reaction or a cross-linking reaction generated under a high-temperature polymerization condition.

There present invention provides a method for producing a polyamide including an amide-based molecular weight controller by an anionic polymerization reaction.

In the method, lactam, and based on 100 parts by weight of the entire lactam, 0.01 to 20 parts by weight of an alkali metal as an initiator, 0.3 parts by weight to 10 parts by weight of an amide-based compound represented by Formula 1 as a molecular weight controller, and 0.002 parts by weight to 7.0 parts by weight of carbon dioxide as an activator are included.

[Formula 1]

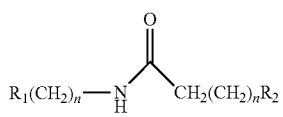

$R_1$ and $R_2$ may be identical to or different from each other, may be a substituent containing a hetero atom, or may each be hydrogen, a $C_1$-$C_{10}$ linear or branched alkyl, a $C_2$-$C_{10}$ linear or branched alkenyl, a $C_6$-$C_{20}$ aryl, a $C_7$-$C_{21}$ alkylaryl, a $C_7$-$C_{21}$ arylalkyl, a $C_3$-$C_{10}$ cycloalkyl, a $C_1$-$C_{10}$ alkoxy, a $C_6$-$C_{20}$ aryloxy, a $C_1$-$C_{10}$ alkylsilyl, a $C_6$-$C_{20}$ arylsilyl, or halogen, and n is each independently a rational number of 0 to 20.

According to the present invention, the molecular weight controller represented by Formula 1 may be produced by the following Reaction Scheme 1.

[Reaction Scheme 1]

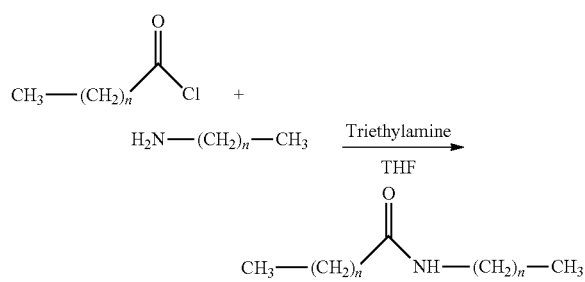

In addition, according to the present invention, the molecular weight controller may include a urea-based compound represented by Formula 2.

[Formula 2]

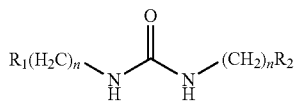

$R_1$ and $R_2$ may be identical to or different from each other, may be a substituent containing a hetero atom, or may each be hydrogen, a $C_1$-$C_{10}$ linear or branched alkyl, a $C_2$-$C_{10}$ linear or branched alkenyl, a $C_6$-$C_{20}$ aryl, a $C_7$-$C_{21}$ alkylaryl, a $C_7$-$C_{21}$ arylalkyl, a $C_3$-$C_{10}$ cycloalkyl, a $C_1$-$C_{10}$ alkoxy, a $C_6$-$C_{20}$ aryloxy, a $C_1$-$C_{10}$ alkylsilyl, a $C_6$-$C_{20}$ arylsilyl, or halogen, and n is each independently a rational number of 0 to 20.

According to the present invention, the molecular weight controller represented by Formula 2 may be produced by the following Reaction Scheme 2.

[Reaction Scheme 2]

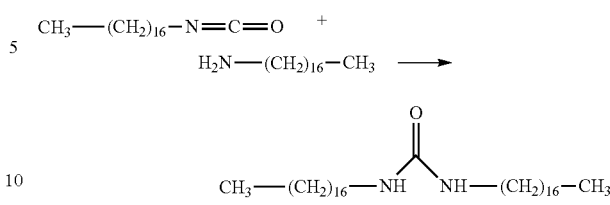

In addition, according to the present invention, the molecular weight controller may include a urea-based compound represented by Formula 3.

[Formula 3]

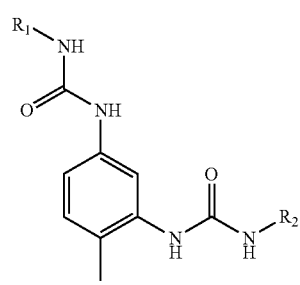

$R_1$ and $R_2$ may be identical to or different from each other, may be a substituent containing a hetero atom, or may each be hydrogen, a $C_1$-$C_{10}$ linear or branched alkyl, a $C_2$-$C_{10}$ linear or branched alkenyl, a $C_6$-$C_{20}$ aryl, a $C_7$-$C_{21}$ alkylaryl, a $C_7$-$C_{21}$ arylalkyl, a $C_3$-$C_{10}$ cycloalkyl, a $C_1$-$C_{10}$ alkoxy, a $C_6$-$C_{20}$ aryloxy, a $C_1$-$C_{10}$ alkylsilyl, a $C_6$-$C_{20}$ arylsilyl, or halogen, and n is each independently a rational number of 0 to 20.

According to the present invention, the molecular weight controller represented by Formula 3 may be produced by the following Reaction Scheme 3.

<Reaction Scheme 2>

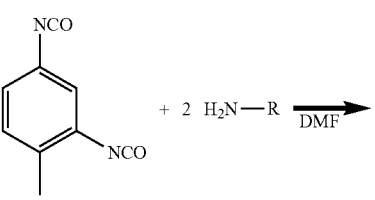

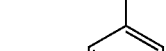

In addition, according to the present invention, the molecular weight controller may include a urea-based compound represented by Formula 4.

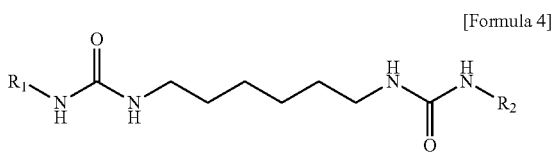

[Formula 4]

$R_1$ and $R_2$ may be identical to or different from each other, may be a substituent containing a hetero atom, or may each be hydrogen, a $C_1$-$C_{10}$ linear or branched alkyl, a $C_2$-$C_{10}$ linear or branched alkenyl, a $C_6$-$C_{20}$ aryl, a $C_7$-$C_{21}$ alkylaryl, a $C_7$-$C_{21}$ arylalkyl, a $C_3$-$C_{10}$ cycloalkyl, a $C_1$-$C_{10}$ alkoxy, a $C_6$-$C_{20}$ aryloxy, a $C_1$-$C_{10}$ alkylsilyl, a $C_6$-$C_{20}$ arylsilyl, or halogen, and n is each independently a rational number of 0 to 20.

According to the present invention, the molecular weight controller represented by Formula 4 may be produced by the following Reaction Scheme.

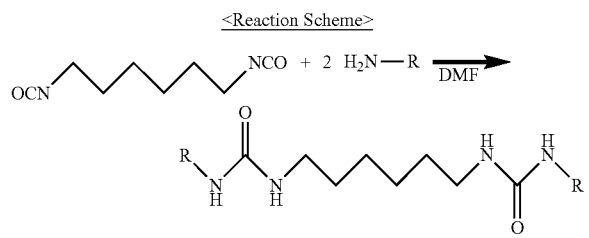

<Reaction Scheme>

Specifically, compositions included in the preparation of the polyamide, including the amide-based molecular weight controller according to the present invention, will be described below.

First, the laurolactam according to the present invention may be preferably used as a monomer for producing a polyamide. However, the present invention is not limited thereto. For example, the laurolactam may include caprolactam, piperidone, pyrrolidone, enantolactam, and caprylactam. In some cases, the laurolactam may include propiolactam, 2-pyrrolidone, valerolactam, caprolactam, heptanolactam, octanolactam, nonanolactam, decanolactam, undecanolactam, and dodecanolactam.

In addition, the alkali metal catalyst according to the present invention is an initiator for producing the polyamide and may include at least one selected from the group consisting of metal hydride, metal hydroxide, and metal alkoxide as a compound that allows the formation of the laurolactam anion.

In a specific example, the metal hydride may include sodium hydride and potassium hydride, the metal hydroxide may include sodium hydroxide and potassium hydroxide, and the metal alkoxide may include potassium tert-butoxide and aluminum isopropoxide, but the present invention is not limited thereto.

For example, the metal alkoxide may include sodium caprolactamate or potassium caprolactamate, alkaline earth metal caprolactamate, for example, magnesium bromide caprolactamate, magnesium chloride caprolactamate, or magnesium biscaprolactamate, an alkali metal, for example, sodium or potassium, alkali metal base, for example, sodium base, for example sodium hydride, sodium, sodium hydroxide, sodium methanolate, sodium ethanolate, sodium propanolate, or sodium butanolate, or at least one selected from the group consisting of potassium base, for example potassium hydride, potassium, potassium hydroxide, potassium methanolate, potassium ethanolate, potassium propanolate, potassium butanolate, or any mixture thereof, preferably at least one selected from the group consisting of sodium caprolactate, potassium caprolactate, magnesium bromide caprolactate, magnesium chloride caprolactate, magnesium biscaprolactate, sodium hydride, sodium, sodium hydroxide, sodium ethanolate, sodium methanolate, sodium propanolate, sodium butanolate, potassium hydride, potassium, potassium hydroxide, potassium methanolate, potassium ethanolate, potassium propanolate, potassium butanolate, and any mixture thereof. In addition, at least one selected from the group consisting of sodium hydride, sodium, sodium caprolactamate, and any mixture thereof may be included.

The metal catalyst may be used in the form of a solid or a solution, and the catalyst is preferably used in the form of a solid. The catalyst is preferably added to a laurolactam melt in which the catalyst can be dissolved. These catalysts lead to particularly rapid reactions, thereby increasing the efficiency of the process of producing the polyamide according to the present invention.

According to the present invention, an amount of the alkali metal catalyst may be in a range of 0.01 parts by weight to 20 parts by weight based on 100 parts by weight of the entire laurolactam. The amount of the alkali metal catalyst may be in a range of preferably 0.03 parts by weight to 10 parts by weight, and more preferably 0.05 parts by weight to 5.0 parts by weight.

In this case, when the alkali metal catalyst is added in an amount of less than 0.01 parts by weight, unpolymerization may occur or a reaction rate may decrease. When the amount of the alkali metal catalyst exceeds 20 parts by weight, a molecular weight reduction problem may occur. Therefore, the above range is preferable.

Next, the molecular weight controller according to the present invention may preferably include at least one selected from the group consisting of compounds represented by Formulae 1 to 4.

According to the present invention, an amount of the molecular weight controller may be in a range of 0.3 parts by weight to 10 parts by weight based on 100 parts by weight of the entire laurolactam. The amount of the molecular weight controller may be in a range of preferably 0.4 parts by weight to 0.7 parts by weight, and more preferably 0.5 parts by weight to 3.0 parts by weight.

In this case, when the molecular weight controller is added in an amount of less than 0.3 parts by weight, a gelation (crosslinking or branching reaction) problem may occur. When the amount of the molecular weight controller exceeds 10 parts by weight, a molecular weight reduction problem may occur. Therefore, the above range is preferable.

In this regard, as shown in FIG. 1, it was confirmed from the rheometer measurement result of the polymerization sample produced as described above that the viscosity is reduced in the case of the polymerization sample including the molecular weight controller. From this, when the molecular weight controller is included in the above range, the molecular weight can be effectively controlled.

Finally, according to the invention, the activator may preferably be carbon dioxide ($CO_2$), but the present invention is not limited thereto. For example, the activator may include at least one selected from the group consisting of benzoyl chloride, N-acetyl caprolactam, N-acetyl laurolactam, octadecyl isocyanate (SIC), toluene diisocyanate (TDI), hexamethylene diisocyanate (HDI), and any mixture thereof.

An amount of the carbon dioxide may be in a range of 0.002 parts by weight to 7.0 parts by weight based on 100 parts by weight of the entire laurolactam. The amount of the carbon dioxide may be in a range of preferably 0.005 parts by weight to 0.5 parts by weight, and more preferably 0.01 parts by weight to 0.1 parts by weight.

In this case, when the carbon dioxide is added in an amount of less than 0.002 parts by weight, unpolymerization may occur or a reaction rate may decrease. When the amount of the carbon dioxide exceeds 7.0 parts by weight, a gelation or depolymerization problem may occur. Therefore, the above range is preferable.

Hereinafter, preferred examples are presented so as to help the understanding of the present invention. However, the following examples are for illustrative purposes only and the present invention is not limited by the following examples.

EXAMPLES

Example 1

Production of Polymerization Sample Using Acetanilide as Molecular Weight Controller In order to remove moisture from a flask, a vacuum was released from the flask that was maintained at 60° C. in a vacuum state. 20 g of laurolactam, 0.14 g of acetanilide, and 0.02 g of NaH were added to the flask and the temperature was raised to 160° C. under vacuum. Then, the reaction temperature was set to 230° C. and nitrogen gas was added thereto. Hydrogen gas generated while the materials were molten was removed. 3.4 ml of carbon dioxide was injected and reacted for 30 minutes. Finally, after 30 minutes, an aqueous formic acid solution (formic acid:distilled water=1:1) was added to the flask to terminate the reaction. A sample having content shown in Table 1 was collected. Using this, a molecular weight and a polydispersity index (PDI) were confirmed and the results thereof are shown in Table 2 below.

TABLE 1

|  | Laurolactam (g) | Alkali metal (g) | Molecular weight controller (g) | Amount of $CO_2$ (ml) |
|---|---|---|---|---|
| Example 1 | 20 | 0.02 | 0.14 | 3.4 |
| Example 2 | 20 | 0.02 | 0.12 | 3.4 |
| Example 3 | 20 | 0.02 | 0.18 | 3.4 |
| Example 4 | 20 | 0.02 | 0.24 | 3.4 |

TABLE 1-continued

|  | Laurolactam (g) | Alkali metal (g) | Molecular weight controller (g) | Amount of $CO_2$ (ml) |
|---|---|---|---|---|
| Example 5 | 20 | 0.02 | 0.27 | 3.4 |
| Example 6 | 20 | 0.02 | 0.05 | 3.4 |
| Example 7 | 20 | 0.02 | 0.6 | 3.4 |
| Example 8 | 20 | 0.02 | 0.9 | 3.4 |
| Example 9 | 20 | 0.02 | 0.15 | 0.2 |
| Example 10 | 20 | 0.02 | 0.15 | 6 |
| Example 11 | 20 | 0.02 | 0.15 | 1000 |
| Comparative Example 1 | 20 | 0.02 | — | 1.7 |
| Comparative Example 2 | 20 | 0.02 | 0.15 | 1.7 |

Example 2

Production of Polymerization Sample Using Urea as Molecular Weight Controller

A reaction was performed in the same manner as in Example 1, except that 0.12 g of urea was used as a molecular weight controller.

Example 3

Production of Polymerization Sample Using Urea as Molecular Weight Controller

A reaction was performed in the same manner as in Example 1, except that 0.18 g of urea was used as a molecular weight controller.

Example 4

Production of Polymerization Sample Using Urea as Molecular Weight Controller

A reaction was performed in the same manner as in Example 1, except that 0.24 g of urea was used as a molecular weight controller.

Example 2

Production of Polymerization Sample Using Urea as Molecular Weight Controller

A reaction was performed in the same manner as in Example 1, except that 0.27 g of urea was used as a molecular weight controller.

Examples 6 to 11

Polymerization samples were produced in the same manner as in Example 1, except that the content ratios of the compositions were different as shown in Table 1.

Examples 12 and 13

Polymerization samples were produced in the same manner as in Example 1, except that the content ratios and types of the compositions were different and the polymerization conditions were set as shown in Table 2.

TABLE 2

|  | Laurolactam (g) | Alkali metal (g) | Molecular weight controller (g) | Amount of NAC (N-acetylcaprolactam) (ml) | Polymerization temperature (° C.) |
|---|---|---|---|---|---|
| Example 12 | 20 | 0.12 | 0.24(Urea) | 0.80 | 230 |
| Example 13 | 20 | 0.12 | 0.14(Urea) | 0.80 | 180 |

Comparative Examples

Comparative Example 1

A reaction was performed in the same manner as in Example 1, except that no molecular weight controller was added.

Comparative Example 2

A reaction was performed in the same manner as in Example 1, except that 0.15 g of EBS was used as a molecular weight controller.

TABLE 3

|  | Molecular weight (g/mol) | Polydispersity index (PDI) | Polymerization |
| --- | --- | --- | --- |
| Example 1 | 95,000 | 2.5 | Polymerization |
| Example 2 | 120,000 | 6.2 | Gelation |
| Example 3 | 60,000 | 2.3 | Polymerization |
| Example 4 | 34,000 | 2.4 | Polymerization |
| Example 5 | 36,000 | 2.4 | Polymerization |
| Example 6 | 64,000 | 2.2 | Polymerization |
| Example 7 | 21,000 | 2.5 | Polymerization |
| Example 8 | 15,000 | 2.5 | Polymerization |
| Example 9 | 3,000 | 6.2 | Unpolymerization |
| Example 10 | 85,000 | 2.5 | Polymerization |
| Example 11 | >160,000 | 5.7 | Gelation |
| Example 12 | 85,000 | 2.5 | Polymerization |
| Example 13 | 93,000 | 2.4 | Polymerization |
| Comparative Example 1 | >160,000 | 6.5 | Gelation |
| Comparative Example 2 | 73,500 | 2.5 | Polymerization |

As shown in Table 3, Comparative Example 1 in which no molecular weight controller was added showed a high molecular weight deviating from a target molecular weight and a high molecular weight distribution, as compared with Example 1. However, Comparative Example 2 in which EBS was used as the molecular weight controller showed a relatively low molecular weight, as compared with Example 1, but showed a target molecular weight distribution range in a molecular weight distribution.

Although the present invention has been described with reference to the drawings according to embodiments of the present invention, it will be understood by those of ordinary skill in the art that various applications and modifications can be made thereto without departing from the scope of the present invention.

The invention claimed is:

1. A method for producing a polyamide by an anionic polymerization reaction, said method comprising: subjecting lactam to an anionic ring-opening polymerization to produce a polyamide in the presence of, based on 100 parts by weight of the lactam:
0.01 parts by weight to 20 parts by weight of an alkali metal-containing initiator,
0.5 parts by weight to 10 parts by weight of urea as a molecular weight controller, and
0.002 parts by weight to 7.0 parts by weight of carbon dioxide as an activator,
wherein the polyamide has a polydispersity index (PDI) of 3.0 or less.

2. The method of claim 1, wherein the lactam comprises at least one selected from the group consisting of laurolactam, caprolactam, piperidone, pyrrolidone, enantolactam, caprylactam, propiolactam, 2-pyrrolidone, valerolactam, caprolactam, heptanolactam, octanolactam, nonanolactam, decanolactam, undecanolactam, and dodecanolactam.

3. The method of claim 1, wherein the alkali metal-containing initiator comprises at least one selected from the group consisting of metal hydride, metal hydroxide, and metal alkoxide.

4. The method of claim 1, wherein the polymerization reaction is performed within a range of 0.5 minutes to 120 minutes.

5. The method of claim 1, wherein the lactam in the polymerization reaction has a conversion rate of 95% or more.

6. The method of claim 1, wherein the polymerization reaction is performed within a range of 180° C. to 300° C.

* * * * *